UNITED STATES PATENT OFFICE.

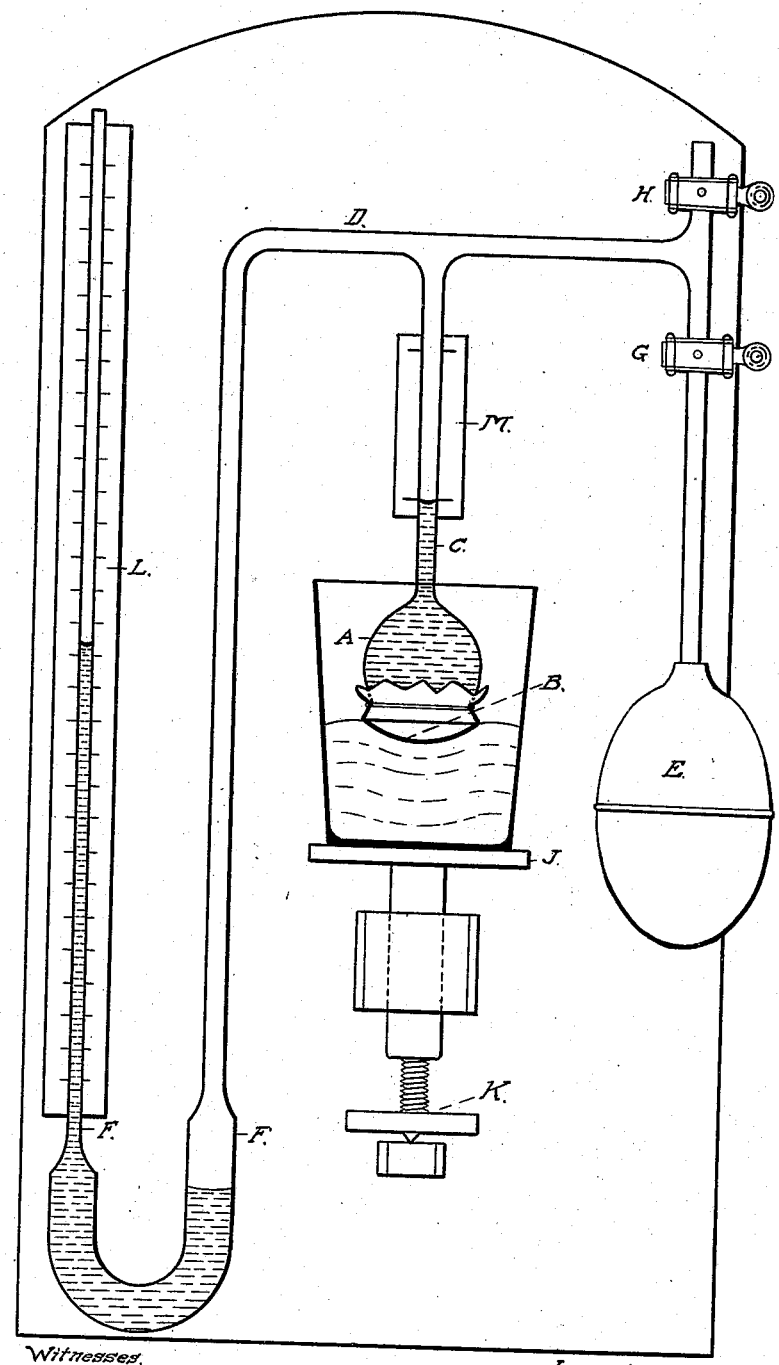

EDMUND SEWALL SMITH, OF NIAGARA FALLS, NEW YORK.

GLUE-TESTER.

No. 911,277.  Specification of Letters Patent.  Patented Feb. 2, 1909.

Application filed March 7, 1908. Serial No. 419,733.

*To all whom it may concern:*

Be it known that I, EDMUND SEWALL SMITH, a citizen of the United States, residing at Niagara Falls, in the county of Niagara and State of New York, have invented a new and useful Glue-Tester, of which the following is a specification.

Glue, gelatin and certain other agglutinants possess the property of absorbing cold water in quantity, which softens them and causes them to swell. If these are heated, they dissolve in the absorbed water, from which solution they gelatinize or form a jelly after cooling. When this process is carried out with carefully measured amounts of glue and water, the strength or consistency of the jelly formed is a most important indication of the quality and binding power of the glue. The stronger the glue, the greater will be the resistance offered by its jelly to outside pressure. This fact is so well recognized in the trade that the so-called "jelly test" has come to be the one most relied upon to determine the relative value and adhesive power of glues. To measure or compare the relative stiffness of these jellies, several methods are in use. The most common one is the simple finger test. The glues are prepared in the usual manner by taking carefully weighed amounts, soaking each in a definite quantity of water in a suitable vessel, usually an ordinary glass tumbler, heating same to about 150 degrees Fahrenheit, and allowing to cool. The relative consistency of the jellies is determined by pressing the finger upon the surface of the jelly, the grading being done wholly by the sense of touch. Another method, the so-called "shot test", has for its object the determination of the weight the various jellies are capable of sustaining.

The apparatus consists essentially of a saucer-shaped disk of tin, the convex side of which presses upon the surface of the jelly. Weight, in the form of shot, is applied until the saucer just penetrates the jelly. The weight of the shot used is taken as an index of the strength of the jelly. Still another method is based upon the time required by rods of different weights to sink a fixed distance into the jelly. It is obvious that the presence of a skin on the surface of the jelly as well as the friction produced in both of these forms of apparatus between their moving parts and the jelly surface or jelly body introduce factors which seriously interfere with their accuracy, in fact, render the results obtained of very questionable value.

My invention relates to an improved device for measuring and comparing the strength of these jellies wherein the defects of the apparatus and methods commonly used are eliminated and by which I am enabled to measure much smaller differences in strength than has heretofore been possible.

In the accompanying drawing, the front elevation of the apparatus is shown.

The pressure chamber A consists of a glass bulb with an opening on its lower face across which is fitted a thin elastic soft rubber diaphragm B. The chamber contains water which also extends up into the stem C, this stem being a glass tube which connects the chamber A with the tube D. The tube D is connected at one end to the soft rubber bulb E and at the other end to the tubes F, F. A stop-cock G serves to close off the bulb E when desired, while another stop-cock H, permits D and its connections being opened to atmospheric pressure at will.

The support of table J carries the glass of glue to be tested. It is vertically adjustable by means of the hand screw K. Tubes F, F are partially filled with water, serving then as a manometer whose readings may be obtained from the scale L. Another scale, M, is located behind the stem C. The glass containing the jelly is placed on the table J. This is then raised by the hand screw K. When the jelly surface comes in contact with the diaphragm, the diaphragm and the water above it are forced upwards. The table is raised until the water in the stem C rises to a certain point on the scale M, stopcock H being open to the atmosphere. This same point is used for all the jellies to be tested, thus furnishing a measured and therefore, constant degree of contact between the jelly surface and the elastic diaphragm B. The stop-cock H is closed and G opened to connect the rubber bulb E with tube D. The bulb is then compressed. Its contained air exerts a pressure upon the water in both the stem C and in the manometer F, F. The pressure in C is communicated to the diaphragm B and, by its expansion, to the jelly held in contact with it. The compression of the bulb E is continued until the water in the stem C reaches a fixed point at the lower end of the scale M, at which point stop-cock G is turned, closing off tube D. The height of the liquid in the manometer is then read on the scale L. The point thus obtained is a direct reading of the pressure upon the jelly surface. When the reading is secured, stop-cock H is opened to the atmosphere thus arranging it for subsequent tests.

In the drawing, the apparatus is shown as it appears when the reading of the manometer is to be taken. The water in the stem C has been forced down to the lower point on scale M, the pressure upon the diaphragm has distorted the jelly and the amount of this pressure is shown on the manometer scale L.

Inasmuch as the diaphragm is always forced a fixed distance into the jelly, this disturbance being measured by the travel of the water on the scale M, the pressure necessary to force it this distance varies with the stiffness of the jelly. Thus the pressure becomes an index of the consistency of the jelly and this pressure is read directly upon the manometer scale. I have found accurate results are obtained by high grade glues by using 12 to 15 grams of dry glue to 100 cubic centimeters of water. With lower grade glues, higher percentages of glue are necessary.

With my apparatus, duplicate tests on the same glue sample may be made, as the surface of the jelly is not broken, and these duplicate tests agree identically with the original. Using different amounts of the same glue, the apparatus will detect as small a variation as one fourth of one gram in the weight of dry glue taken. It will also measure jellies too soft to be touched by the finger.

I do not limit my invention to apparatus for measuring the strength of glues and gelatins. It is equally useful with many gelatinous-like substances, for example:—starch, gelose, agar-agar, Irish moss, "Japanese" gelatin, etc.

Having now described my invention, I claim:—

1. An apparatus for measuring the strength of gelatinous substances, comprising a pressure chamber one side of which is provided with a flexible elastic diaphragm, means for bringing one free surface of the gelatinous substance into contact with said diaphragm, means for generating pressure within said chamber thereby expanding the diaphragm and displacing the gelatinous substance, and means for measuring such pressure, substantially as described.

2. An apparatus for measuring the strength of gelatinous substances, comprising a pressure chamber one side of which is provided with a flexible elastic diaphragm, means for bringing one free surface of the gelatinous substance into contact with said diaphragm, means for generating pressure within said chamber thereby expanding the diaphragm and displacing the gelatinous substance, means of measuring the amount of such displacement, and means for measuring said pressure, substantially as described.

3. An apparatus for measuring the strength of gelatinous substances, comprising the pressure chamber A provided with the elastic diaphragm B, the adjustable holder J supporting the gelatinous substance, the pressure generator E and the manometer tubes F, F, substantially as shown.

In testimony whereof, I have signed my name to this specification in the presence of two subscribing witnesses.

EDMUND SEWALL SMITH.

Witnesses:
G. W. MANLEY,
A. D. KYSOR.